Oct. 8, 1957 P. C. VAN DER WILLIGEN 2,809,275
METHOD OF MANUFACTURING STUD WELDING
CARTRIDGES AND METHOD OF WELDING
Filed March 27, 1953
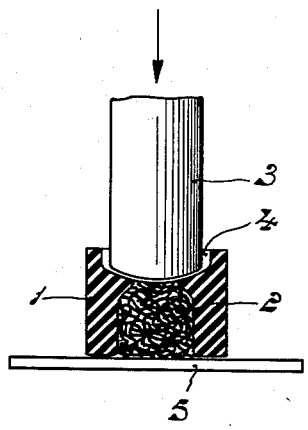
INVENTOR
PAUL CHRISTIAAN VAN DER WILLIGEN
BY
AGENT

United States Patent Office 2,809,275
Patented Oct. 8, 1957

2,809,275

METHOD OF MANUFACTURING STUD WELDING CARTRIDGES AND METHOD OF WELDING

Paul Christiaan van der Willigen, Eindhoven, Netherlands, assignor, by mesne assignments, to North American Philips Company, Inc., New York, N. Y., a corporation of Delaware Application March 27, 1953, Serial No. 345,243

Claims priority, application Netherlands June 18, 1952

4 Claims. (Cl. 219—99)

The invention relates to the manufacture of welding cartridges of the kind used for example for welding a stud or bolt to a sheet or other metal surface by striking an electric arc between the end of the stud and the sheet and by pressing the end of the stud against the sheet after the metal has been melted owing to the heat developed by the arc; it furthermore relates to the welding cartridges manufactured by this method.

It is known that in this method use is made of welding cartridges in the form of a body surrounding the arc and constituted wholly or in part by slag-building constituents and metal powders usually containing manganese metal, mostly ferro-manganese. It is also known that such welding cartridges, referred to hereinafter as stud welding cartridges, must be previously degasified, since, during the welding operation, the development of gases affects adversely the quality of the weld.

In this case it is generally not sufficient to heat the cartridges to a few hundred degrees centigrade. Usually a heating temperature of 500° C. or more, frequently of 700 to 900° C. is required to dissociate the gas producing substances and to expel the gases to a sufficient extent, so that during this degasifying operation the slag-building constituents of the stud welding cartridges are sintered, which is utilised to improve the coherence of the powders of the cartridge. In order to avoid undesirable oxidation of the metal particles in the stud welding cartridges during this heating operation, this is performed in vacuo or in a space filled with an inert gas, so that the stud welding cartridges must be subjected to comparatively complicated operations, which requires a costly apparatus.

According to the invention this disadvantage is mitigated by coating the metal particles with a film which prevents the metal substratum from being oxidised at the high temperature occurring during manufacture.

Consequently, in the method according to the invention, stud welding cartridges can be manufactured, which permit of being heated in an oxygenous atmosphere, for example, air, whilst the metal contained in these cartridges does not lose its activity, required during the welding operation, owing to the action of oxygen.

The invention relates to a method of manufacturing stud welding cartridges, in which a body comprising metal particles and slag-building constituents is heated to a high temperature and is characterised in that the metal particles are coated with a film, which prevents the metal from being affected by oxygen during the heating operation and in that heating is performed in an oxygenous atmosphere.

Such protecting films may, for example, be obtained by coating the metal particles with a suitable metal oxide. For this purpose use may be made of oxides of silicon, chromium, aluminum or zirconium. Short bits of wire coated with such a metal may, for example, be mixed with the slag-building mass and then subjected to oxidation.

In a preferred embodiment of the invention use is made of an alloy of the metal to be provided in the stud welding cartridge for technical reasons and of a metal coating itself with a protective film under the action of oxygen.

This embodiment is particularly suitable to protect manganese metal or ferro-manganese from undesirable oxidation.

Use is preferably made of a manganese-silicon alloy.

It has been found that with a manganese-silicon alloy containing 10% of silicon, protection of the manganese metal from oxidation is obtained already at a heating temperature of about 700° C. A higher silicon content improves the protection and, usually, does not constitute a limitation, at least, if the quantity of the alloy in the stud welding cartridge is not too large. It is known that silicon metal in the form of ferro-silicon is frequently used in small quantities for improving the quality of a weld.

A preferred embodiment of a studwelding cartridge according to the invention is obtained by composing a pulverulent mixture of 30% by weight of magnesium-oxyde, 25% by weight of calciumfluoride, 35% by weight of bentonite and 10% by weight of a manganese-silicon alloy containing 35% by weight of silicon and 55% by weight of manganese, the rest being iron. To this mixture a small quantity of water is added after which it is shaped by moulding to an object which approximately corresponds in shape with the cartridge which is to be prepared. Subsequently the object is dried and heated in a furnace to sinter the slag forming powder at a temperature of 800° centigrade. The furnace has an opening through which gases are removed and air has access during heating. After having been heated during an hour the cartridges are ready for use.

In the accompanying drawing a cross-section of the cartridge is indicated by 1. In the center of the cartridge 1 there is provided an arc initiating material 2. The iron stud 3 is fitted in recess 4 and pressed in the direction of the arrow by means of a stud holder (not shown) and at the opposite end surface the cartridge 1 contacts the iron plate 5 to which the cartridge is to be united. An electric current of welding intensity is now conducted through stud 3, arc initiating material 2 towards plate 5, initiating the arc and deforming cartridge 1 thus allowing the end face of stud 3 to contact plate 5 and to be welded thereto.

What is claimed is:

1. A method of uniting the end of a stud-like metal object to a metal surface comprising interposing a heat-deformable, slag-forming object between the end of said stud-like metal object and said metal surface, said slag-forming object being prepared by moulding a powdered mixture containing slag-forming ingredients and a metal powder composed of a metal alloy and at least 10% of silicon, said moulded mixture being subsequently heated to sinter the slag-forming powder in an oxygen-containing atmosphere, exerting pressure on said stud-like object in the direction of said metal surface, and igniting an arc between said end of said stud-like object and said metal surface thereby causing the heat-deformable slag-forming object to be deformed and moving the end of said stud-like object into uniting engagement with said metal surface.

2. A method as set forth in claim 1 wherein said alloy is a manganese-silicon alloy.

3. A stud welding cartridge consisting essentially of a slag-forming object composed of magnesium oxide, calcium fluoride and bentonite, and metal powders, and a refractory film coating for said metal powders being a metal oxide selected from the group consisting of silicon, chromium, aluminum and zirconium, said refractory film coating protecting said metal powders from the action of oxygen.

4. A stud welding cartridge as set forth in claim 3 wherein said refractory film contains metal particles of a superficially oxidized alloy of manganese and at least 10% by weight of silicon.

References Cited in the file of this patent

UNITED STATES PATENTS

| | | |
|---|---|---|
| 1,905,081 | Woods | Apr. 25, 1933 |
| 1,936,799 | Mathias | Nov. 28, 1933 |
| 2,003,019 | Strobel | May 28, 1935 |
| 2,068,658 | Cox | Jan. 26, 1937 |
| 2,100,537 | Conway | Nov. 30, 1937 |
| 2,459,957 | Palmer | Jan. 25, 1949 |
| 2,510,000 | Van der Willigen et al. | May 30, 1950 |
| 2,587,251 | Van der Willigen | Feb. 26, 1952 |
| 2,643,319 | Van der Willigen | June 23, 1953 |

FOREIGN PATENTS

| | | |
|---|---|---|
| 980,228 | France | Dec. 20, 1950 |